TRUNK CIRCUIT

Filed Sept. 20, 1955 2 Sheets-Sheet 1

INVENTOR
H. C. ALTHOUSE
BY [signature]
ATTORNEY

INVENTOR
H. C. ALTHOUSE
BY [signature]
ATTORNEY 2,803,706

TRUNK CIRCUIT

Homer C. Althouse, West Orange, N. J., assignor to American Telephone and Telegraph Company, a corporation of New York Application September 20, 1955, Serial No. 535,393

5 Claims. (Cl. 179—18)

Figure 1:
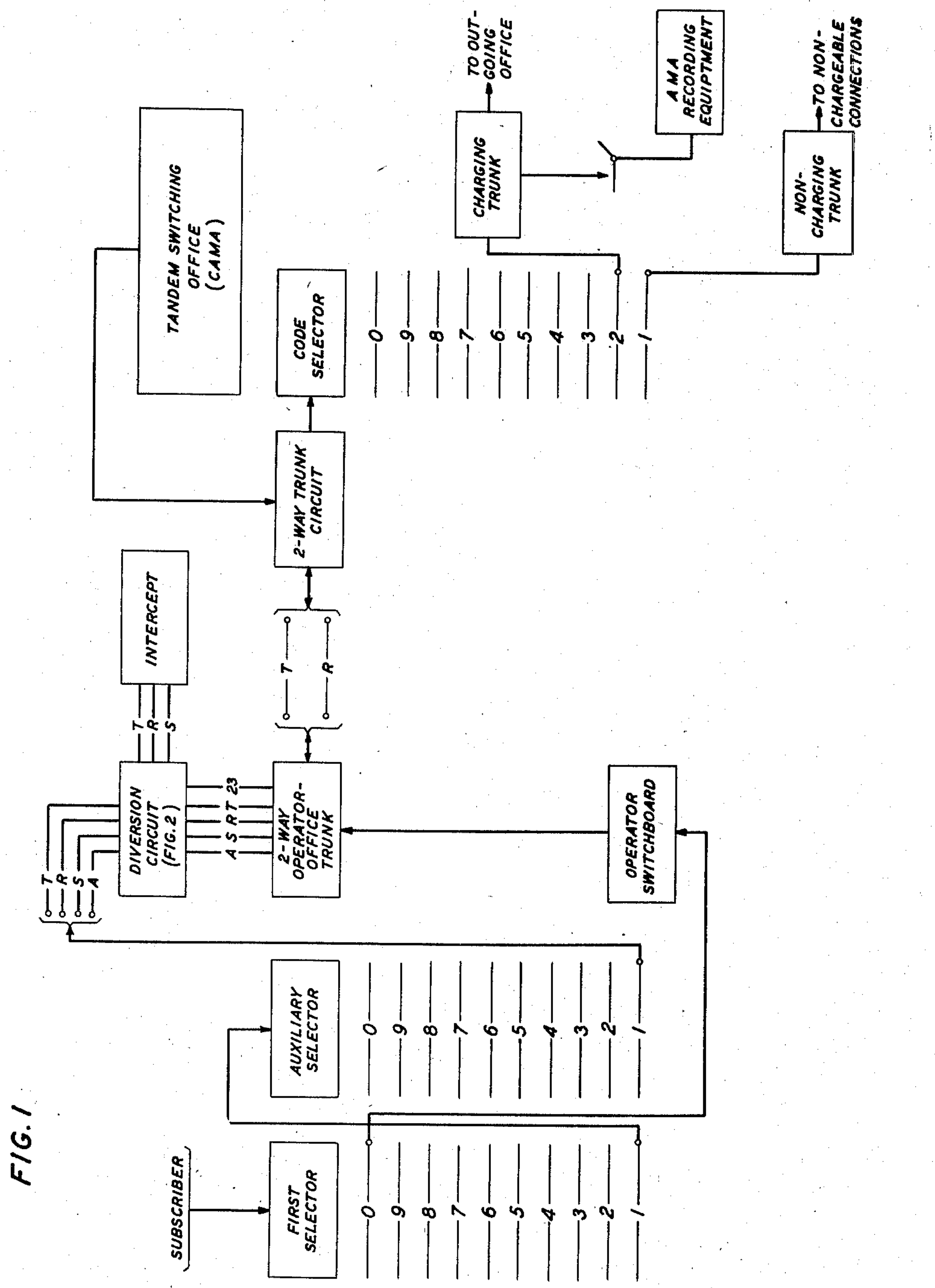

This invention relates to telephone switching systems and more particularly to such systems comprehending the interconnection of two or more central offices by trunks commonly usable for toll and non-toll services.

In certain telephone systems, automatic recording devices have been provided to more economically record individual subscriber's service, and to prepare the usual billing from such records. The cost of such recording equipment, however, is substantial; and in order to justify the necessary capital investment, it is desirable that a large number of subscribers' stations be served by each recording unit. Accordingly, in some instances, it has been found necessary to connect a plurality of small central offices to a centrally located switching center in order that the advantages of the automatic recording equipment located at such center may be made available to a large number of subscribers.

At certain of such small central offices, the volume of traffic directed to the centralized switching center may be of such small magnitude that only a minimum number of interconnecting trunks may be economically justified. In such cases, it is advantageous to make such trunks available both to operators and to individual subscribers. Consequently it is requisite that some provision be made to permit both the non-chargeable and chargeable use of such trunks, the subscribers being permitted use thereof on a chargeable basis, whereas the operators are given across thereto without charge.

In small offices having the well-known step-by-step type equipment, it is anticipated that a subscriber might gain access to one of the aforementioned trunks by dialing a directing code, for example, 11. A third digit would then be dialed and transmitted along the trunk to the switching center, at which the trunk would be connected to another trunk extending in the desired direction and, of course, to the recording equipment. For the operator to gain access to such switching center over the same trunks, and to other trunks thereat for the establishment of no-charge connections, it is anticipated that operators would transmit a different third digit, thereby establishing a unique path from the trunk into the system without obtaining access to the recording equipment. However, it is likely that subscribers eventually would discover the identity of the operator's third digit, and that, instead of dialing the proper third digit assigned for subscriber's use, some of them might dial the operator's digit and thereby gain access at the switching center at an outgoing trunk over which a connection could be established to any telephone station in the United States without incurring the appropriate charge therefor.

It is therefore an object of this invention to provide a discriminatory circuit to be interposed between the local central office and each of the aforementioned trunks to the switching center, whereby subscribers' calls otherwise placeable on a non-chargeable basis would be intercepted.

Accordingly, in accordance with one feature of this invention, a cut-through relay is interposed between the local central office and the aforementioned trunk circuit to divert the extension of a subscriber's call in response to the subscriber's dialing of the operator's code.

In accordance with another feature of this invention, a begin-pulse and an end-pulse relay are interconnected with a maintain-cut-through relay to control operation of the cut-through relay in response to reception of dial pulses.

Figure 2:
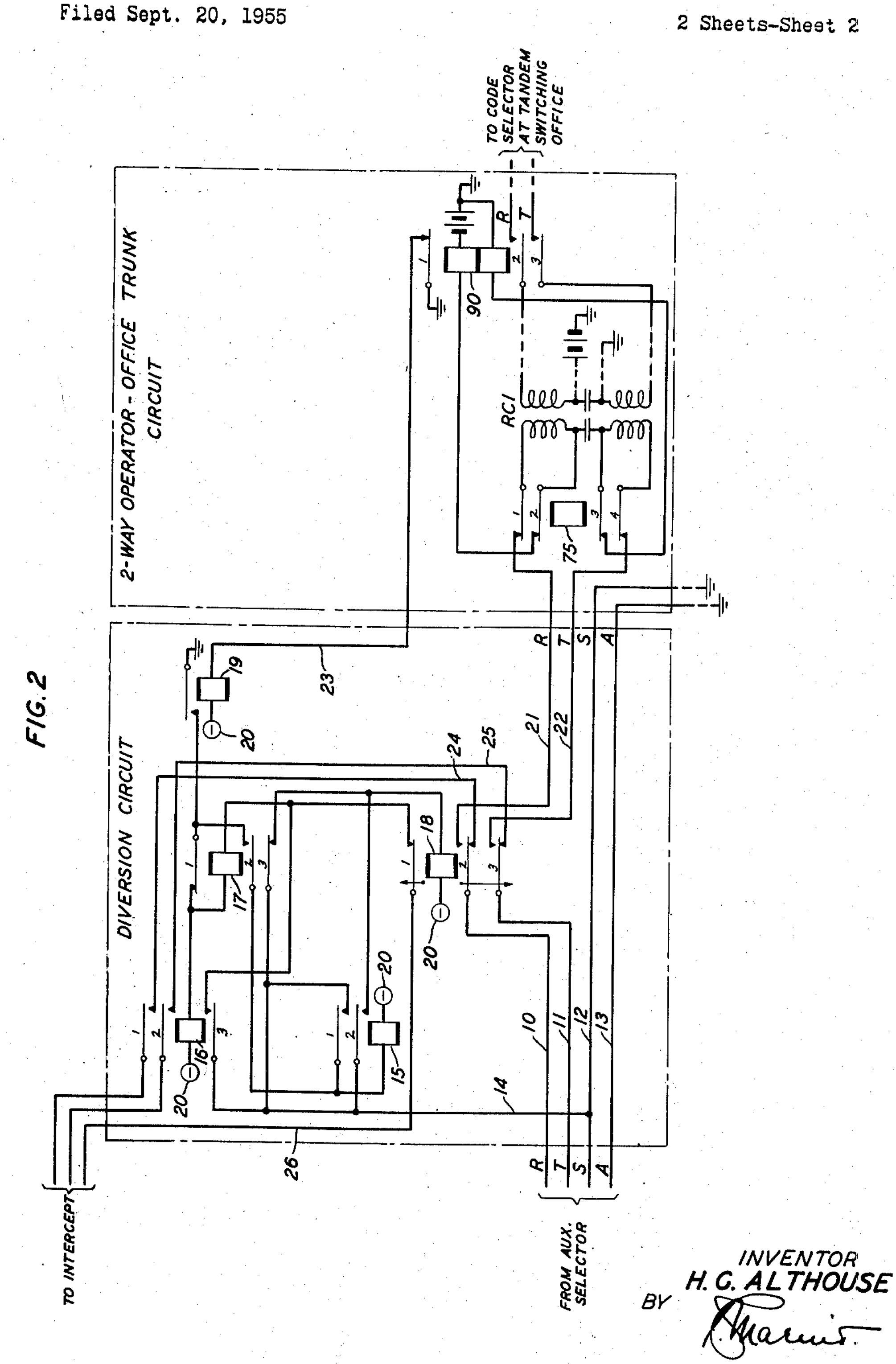

These and other objects and features of this invention will be apparent from the following detailed description, by way of example, with reference to the drawing in which:

Fig. 1 is a semiblock diagram depicting the relevant components of the aforementioned local central office equipment and the tandem switching office; and Fig. 2 is a schematic diagram setting forth in detail the diversion circuit of Fig. 1 and associated control devices.

Referring, now, to Fig. 1, it will be noted that a connection is shown from a subscriber to a first selector switch of the well-known step-by-step type. If the subscriber initially dials the digit "1," this first selector will step to the first level and rotate in the conventional manner to locate a path to an idle auxiliary selector. If the customer then dials a second digit "1," the auxiliary selector will step to the first level and similarly rotate to find a path to an idle diversion circuit, thereby extending conductors tip (T), ring (R), sleeve (S) and (A) of the selector to the two-way trunk, the tip (T) and ring (R) conductors thereof extending to the tandem switching office. The diversion circuit is more particularly illustrated in the schematic diagram of Fig. 2; however, in advance of a detailed description of this circuit, it will be helpful to understand the functioning thereof with respect to the remaining devices depicted in Fig. 1.

As hereinbefore mentioned, the dialing of a third digit will be required to extend connections over a two-way trunk to the tandem switching center, and it will be further noted from Fig. 1 that both the operator and the subscriber may have access to this trunk by way of the "common" two-way trunk. The third dialed digit will control the code selector at the tandem switching office at which the trunk terminates. If the third digit is "1," the selector will rise to the first level and then rotate to locate a non-charging trunk. On the other hand, if the third dialed digit is "2," the aforementioned code selector will step to the second level and rotate to find a charging trunk leading out of the office. This "charging" trunk has access to AMA recording equipment (not shown) that will record the details of the established connection.

It is desired to intercept customer dialed calls which might pass through both the local and tandem offices without charge; it is therefore proposed to interpose the diversion circuit mentioned above for preventing free connections in response to the dialing of the operator code by such customers.

In Fig. 1, the arrow leading from the tandem switching office (CAMA) to the two-way trunk circuit indicates that calls may be directed in the reverse direction over the trunk circuit.

Turning, now to Fig. 2, it will be noted that conductors R, T, S, and A, identified as 10, 11, 12, and 13, respectively, are shown entering the diversion device from the auxiliary selector. Conductor A is merely extended through the device to the two-way operator office trunk. In response to dialing of the second unit digit, sleeve conductor 12 is grounded in the conventional manner, thereby extending a path from ground, conductor 14, through the No. 3 back contacts of relay 17, the coil of relay 18, and thence to negative battery. Relay 18 operates in this circuit and extends ring and tip conductors 10 and 11 through its Nos 2 and 3 front contacts to outgoing ring and tip conductors 21 and 22, respectively, extending the dialing loop to both windings of the trunk pulsing relay 90, over the left windings of repeating coil RC1 and the contacts of relay 75. Relay 90 operates over the loop, closing over its Nos 2 and 3 contacts, conductors R and T and booster battery and ground to the winding of a pulsing relay (not shown) in the code selector at the tandem office. Over its No. 1 contacts, relay 90 removes ground from lead 23.

The subscriber now dials the aforementioned third digit and pulses according to the dialed numeral are transmitted via conductors 10 and 11, the Nos. 2 and 3 front contacts of relay 18, conductors 21 and 22, the Nos. 1 and 4 back contacts of relay 75, the primary windings of repeating coil RC1, and the Nos. 2 and 3 back contacts of relay 75 to the coils of pulse repeating relay 90, and thence to battery and ground. Relay 90 faithfully reproduces the dial pulses and correspondingly opens and closes the trunk loop over its Nos. 2 and 3 front contacts to the pulsing relay in the code selector at the tandem switching office. In addition, it controls operation of relay 19 over the path from ground, the No. 1 contacts of relay 90, conductor 23, the coil of relay 19 and source of negative potential 20.

Circuitry illustrated in Fig. 2 as part of the two-way operator-office trunk, is merely representative of one arrangement thereof which is well known in the art and to which reference may be made in Patent No. 2,268,635 which was granted to John Baumfalk et al. on January 6, 1942. In the interest of clarity, relays 75 and 90 of Fig. 2 are similarly identified in the drawing of the referenced patent. Although the back contacts 1 of relay 90 are not disclosed therein, it will be recognized that such contacts could be readily added thereto. As will be noted by those skilled in the art, other two-way operator-office trunks or path-extending devices could be employed to extend talking paths, and to repeat dial pulsing for operation of the diversion circuit relays.

Returning, now, to the operation of the diversion circuit of Fig. 2, if the third dialed digit is "1," relay 19 will be energized and released once, and operation will be according to the description immediately following, whereby connections are routed to the intercept device. On the other hand, if the third dialed digit is "2," relay 19 will be energized and released twice, and operation will be according to the description hereinafter noted, wherein talking paths are extended to the tandem office at which a toll trunk is suitably seized.

If the third digit is "1," relay 19 will operate at the beginning of the pulse and complete a path over its front contacts and the No. 1 contacts of relay 17 to the coil of relay 16, and thence to negative battery. In addition, the path is extended to the coil of relay 17 and thence via the No. 3 front contacts of relay 16 and conductor 14 to the incoming sleeve lead 12 which, as previously mentioned, is grounded by the preceding apparatus. Accordingly relay 16 operates, but relay 17 remains unoperated since ground is connected to both terminals of its operating coil. At the end of the first pulse, relay 19 is deenergized and its contacts open, thereby breaking the path from ground over the No. 1 contacts of relay 17 to the relay 17 operating coil. Relay 17 now operates over a path from battery 20, relay coil 16, the coil of relay 17, the No. 3 contacts of relay 16, conductor 14, and grounded sleeve lead 12, the characteristics of relays 16 and 17 being such that both will operate when their coils are serially connected to the source of operating potential 20. Relays 16 and 17 are now locked to ground via the previously mentioned No. 3 contacts of relay 16. The No. 3 contacts of relay 17, in opening, interrupt the path from ground to the coil of relay 18, causing the latter relay to become deenergized, and thereby causing the incoming ring and tip conductors 10 and 11 to be transferred from the outgoing trunk conductors 21 and 22 to conductors 24 and 25, respectively, the latter serving to extend the path via the Nos. 1 and 2 front contacts of relay 16 to the intercepting device. Thus a subscriber dialing the prohibited operated code "111" is prevented from gaining access to the commonly used trunks and is instead suitably diverted to an intercept device.

When the subscriber disconnects his instrument from the line, ground is removed from sleeve conductor 12, thereby resetting relays 16 and 17 to the normal condition.

It is desired that connections be extended through to the tandem switching office when the subscriber dials the proper third digit, i. e., "2," and such operation of the circuit will now be described.

As before, the step-by-step equipment connects sleeve conductor 12 to ground, thereby operating relay 18 over the previously described path. Pulsing relay 19 now operates in response to the first pulse of the third dialed digit and extends paths as hereinbefore described to operate relay 16. At the end of the first pulse, relay 19 is deenergized and opens the path from ground to the coil of relay 17, thus operating relay 17 in series with relay 16 as explained above. The No. 3 contacts of relay 17 now open the path from the coil of relay 18 to ground and relay 18 contacts tend to become disengaged; however, characteristics of the relay are such that its contacts release very slowly, and before they change electrical condition, the second operating pulse is received at the coil of relay 19, thereby operating same and extending a path from ground over the front contacts thereof and the No. 2 front contacts of relay 17 to the operating coil of relay 15 and thence to negative battery 20, thereby energizing and operating relay 15. In operating, this relay extends ground from sleeve lead 12 over conductor 14 and its No. 2 front contacts to the operating coil of relay 18, thus reenergizing relay 18 before the contacts thereof have changed position. In addition, relay 15 locks itself to ground via sleeve lead 12 and conductor 14 over its own No. 1 front contacts, thus assuring the continuity of an operating path to relay 18 so long as the connection is maintained by the calling subscriber.

Relays 15, 16, 17, and 18 are now locked to ground over sleeve conductor 12 and will remain operated until reset in response to subscriber disconnect. The trunking path comprising ring and tip conductors 10 and 11 will therefore be extended through the Nos. 2 and 3 front contacts of relay 18 and conductors 21 and 22 to the aforementioned trunk circuit. Subsequent customer dialing will have no effect upon the diversion circuit because the No. 1 contacts of relay 17 are open, and further because ground already appears at the contacts of relay 19 from the sleeve lead over conductor 14, the No. 1 front contacts of relay 15, and the No. 2 front contacts of relay 17. The presence of this ground will keep the above relays operated regardless of the subsequent pulsing operations of relay 19.

In addition to the functions hereinbefore said to be performed by relay 16, contacts 1 and 2 thereof are interposed in the paths leading from conductors 24 and 25 to the intercepting device, which in some cases may be a tone source, in order to prevent introduction of tone potential on to ring and tip conductors 10 and 11 when the diversion device is idle. Were relay 16 contacts not thus interposed, paths would lie from the tone source via conductors 24 and 25, the Nos. 2 and 3 back contacts of relay 18, and conductors 10 and 11 to the auxiliary selector.

One additional function performed by relay 18 comprises the completion of a path from sleeve conductor 12 via conductor 14, the No. 3 front contacts of relay 16, the No. 1 back contacts of relay 18 and conductor 26 to the intercept device during the period of interception.

Specific types of relays contemplated by the hereinbefore described embodiment are unimportant except for the following characteristics thereof. Relays 15, 16, 17, and 19 may, for example, be of the conventional telephone type with characteristics of relatively rapid operation and release. Relay 18, however, should have a slow release and rapid pick-up characteristic in order that it may ride over the momentary deenergization hereinbefore set forth.

Although the subject invention has been illustrated by a particular embodiment thereof, the invention is not limited to the specific circuits therein disclosed. Various applications, modifications and arrangements of the invention will readily occur to those skilled in the art. For example, the customer's third dialing digit could be any number greater than one.

The terms and expressions hereinbefore employed in reference to the invention are used as terms of description and not of limitation; and there is no intention in the use of such terms and expressions of excluding equivalents of the features shown and described or parts thereof, but on the contrary it is intended to include therein any and all equivalents, modifications and adaptations which may be employed without departing from the spirit of the invention.

What is claimed is:

1. In a telephone system, a trunk terminating in a selector having two outlets, said trunk having two points of access at its originating end, means responsive to a first dial pulse code transmitted from one of said points of access for operating said selector to engage one of said outlets, means responsive to a second dial pulse code transmitted from the other of said access points for operating said selector to engage the other of said outlets, and means connected to said other of said access points responsive to said first dial pulse code transmitted from said other of said access points for blocking the effective operation of said selector.

2. In a telephone system, a path diverting device comprising an inlet and two outlets, a first relay for controllably extending paths from said inlet to said outlets, a second relay responsive to subscriber dialed pulses, a third relay responsive to the initial pulse received by said second relay, a fourth relay responsive to the termination of said initial pulse, and a fifth relay responsive to the second pulse received by said pulsing relay, said first relay being controlled by said other relays to establish and maintain paths from said inlet to one of said outlets in response to reception of only one electrical impulse by said second relay, or to establish and maintain paths from said inlet to the other of said outlets in response to reception of two or more electrical impulses by said second relay.

3. In a telephone system, a trunk, means for connecting operators and dialing subscribers to the originating end of said trunk, means for connecting a binary selector to the terminating end of said trunk, said binary selector being operable in response to a first impulse code transmitted over said trunk to extend connections from said trunk to an outlet, said binary selector being further operable in response to another impulse code transmitted over said trunk to extend connections from said trunk to another outlet, and means responsive to one of said codes for diverting connections from said trunk to an intercepting device.

4. In a telephone system, a device for preventing free customer telephone calls, comprising a trunk commonly available for chargeable and non-chargeable service, said trunk terminating in a selecting device having two outlets, one of said outlets having automatic recording apparatus connectable thereto, said selecting device being controllable to extend a connection from said trunk to additional switching appartus via said one of said outlets in response to the actuation of said selecting device by a first predetermined code expressing a chargeable connection, said selecting device being also controllable to extend said connection to said switching apparatus via the other of said outlets in response to actuation thereof by a second predetermined code expressing a free call, and circuit diverting apparatus serially interposed in paths connecting a chargeable subscriber's line to said trunk for diverting the path otherwise leading from said line to said trunk in response to the activation thereof by said second predetermined code.

5. In a telephone system, a path diverting device having an input and two outputs each comprising tip, ring and sleeve conductors, a cut-through relay for controllably extending paths from said input to said outputs, a pulsing relay responsive to subscriber dialed pulses, a begin-pulse relay responsive to the initial pulse received by said pulsing relay, an end-pulse relay responsive to the termination of said initial pulse, and a maintain-cut-through relay responsive to the second pulse received by said pulsing relay, said cut-through relay being controlled by said other relays to establish and maintain paths from said input conductors to one of said outputs in response to the reception of two or more electrical impulses by said pulsing relay, or to establish and maintain paths from said input conductors to the other output in response to reception of only one electrical impulse by said pulsing relay.

References Cited in the file of this patent

UNITED STATES PATENTS

| | | |
|---|---|---|
| 2,586,534 | Gray | Feb. 19, 1952 |
| 2,673,243 | Lomax | Mar. 23, 1954 |
| 2,733,295 | Lomax | Jan. 31, 1956 |